(12) United States Patent
Hatori et al.

(10) Patent No.: US 9,068,693 B2
(45) Date of Patent: Jun. 30, 2015

(54) LUBRICANT SUPPLYING DEVICE, IMAGE FORMING APPARATUS, AND PROCESS CARTRIDGE

(71) Applicants: Satoshi Hatori, Kanagawa (JP); Ryohta Gotoh, Tokyo (JP); Akira Fujimori, Kanagawa (JP); Naohiro Kumagai, Kanagawa (JP); Kaoru Yoshino, Tokyo (JP); Hideyasu Seki, Kanagawa (JP); Nobuyuki Taguchi, Kanagawa (JP); Hiromichi Ninomiya, Kanagawa (JP); Yuta Azeyanagi, Kanagawa (JP); Yasuhito Kuboshima, Tokyo (JP)

(72) Inventors: Satoshi Hatori, Kanagawa (JP); Ryohta Gotoh, Tokyo (JP); Akira Fujimori, Kanagawa (JP); Naohiro Kumagai, Kanagawa (JP); Kaoru Yoshino, Tokyo (JP); Hideyasu Seki, Kanagawa (JP); Nobuyuki Taguchi, Kanagawa (JP); Hiromichi Ninomiya, Kanagawa (JP); Yuta Azeyanagi, Kanagawa (JP); Yasuhito Kuboshima, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 48 days.

(21) Appl. No.: 13/790,017

(22) Filed: Mar. 8, 2013

(65) Prior Publication Data
US 2013/0243449 A1    Sep. 19, 2013

(30) Foreign Application Priority Data

Mar. 19, 2012  (JP) .................................. 2012-062590
Jul. 31, 2012  (JP) .................................. 2012-170168

(51) Int. Cl.
*G03G 21/00* (2006.01)
*F16N 15/00* (2006.01)

(52) U.S. Cl.
CPC ............ *F16N 15/00* (2013.01); *G03G 21/0094* (2013.01)

(58) Field of Classification Search
CPC ... G03G 15/55; G03G 21/00; G03G 21/0094; F16N 15/00
USPC .................................... 399/24, 346, 324, 325
See application file for complete search history.

(56) References Cited

U.S. PATENT DOCUMENTS

| | | | |
|---|---|---|---|
| 2007/0068738 A1 | 3/2007 | Kawahara et al. ............... | 184/99 |
| 2007/0172273 A1* | 7/2007 | Harada et al. .................. | 399/346 |

(Continued)

FOREIGN PATENT DOCUMENTS

| | | |
|---|---|---|
| CN | 101846923 A | 9/2010 |
| CN | 102004408 A | 4/2011 |

(Continued)

OTHER PUBLICATIONS

Office Action issued Mar. 4, 2015 in Chinese Patent Application No. 201310201822.1 (with English translation).

*Primary Examiner* — Sophia S Chen
(74) *Attorney, Agent, or Firm* — Oblon, McClelland, Maier & Neustadt, L.L.P.

(57) ABSTRACT

A lubricant supplying device includes: lubricant; a supplying member that supplies the lubricant to a lubricant supply target; and a remaining amount detecting unit that detects that a remaining amount of the lubricant is equal to or smaller than a certain amount. The remaining amount detecting unit includes a first electrode member and a second electrode member. The lubricant supplying device includes a member that causes at least a part of the second electrode member to move and causes the second electrode member to abut the first electrode member with an increase in consumption of the lubricant.

35 Claims, 10 Drawing Sheets

(56) References Cited

U.S. PATENT DOCUMENTS

| | | | |
|---|---|---|---|
| 2008/0181689 A1 | 7/2008 | Fujimori | 399/346 |
| 2009/0060600 A1 | 3/2009 | Ninomiya et al. | 399/346 |
| 2009/0103944 A1 | 4/2009 | Shintani et al. | 399/111 |
| 2009/0120356 A1 | 5/2009 | Karasawa et al. | 118/107 |
| 2010/0183349 A1 | 7/2010 | Shintani et al. | 399/346 |
| 2011/0076075 A1 | 3/2011 | Arai et al. | 399/346 |
| 2011/0123239 A1 | 5/2011 | Azeyanagi et al. | 399/346 |
| 2011/0170908 A1 | 7/2011 | Saitoh et al. | 399/127 |
| 2011/0229232 A1 | 9/2011 | Kojima et al. | 399/346 |

FOREIGN PATENT DOCUMENTS

| | | |
|---|---|---|
| CN | 102221806 A | 10/2011 |
| JP | 08-314346 | 11/1996 |
| JP | 2004-361698 | 12/2004 |
| JP | 2007-293240 | 11/2007 |
| JP | 2010-243997 | 10/2010 |
| JP | 2010-271665 | 12/2010 |

* cited by examiner

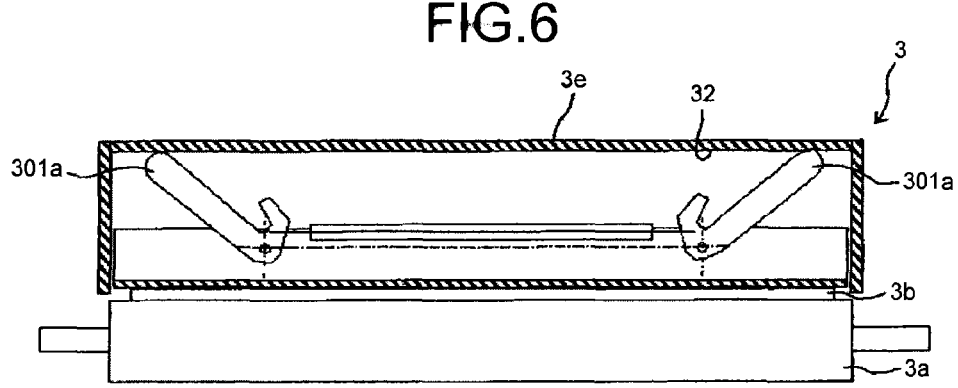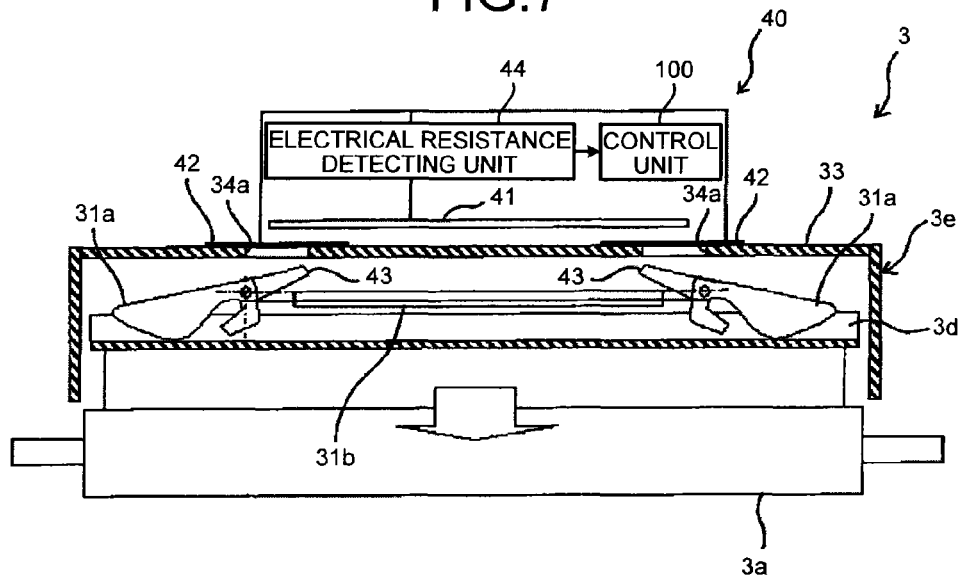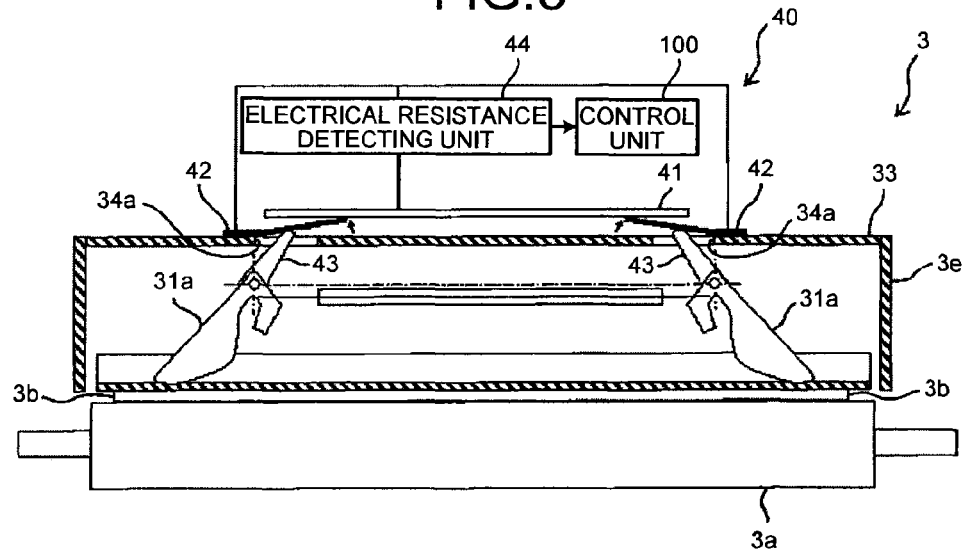

FIG.19
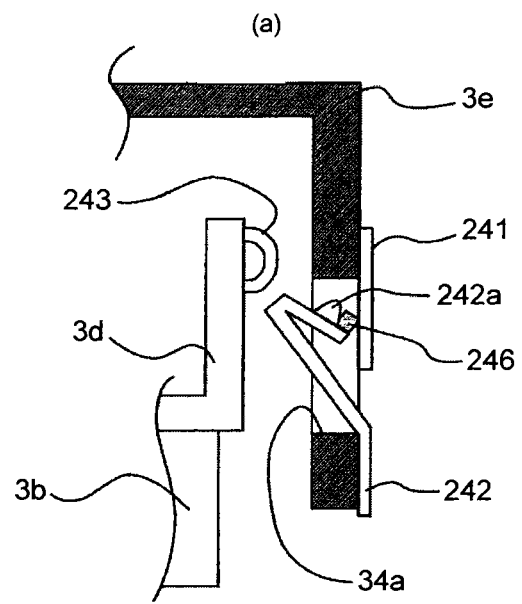
(a)
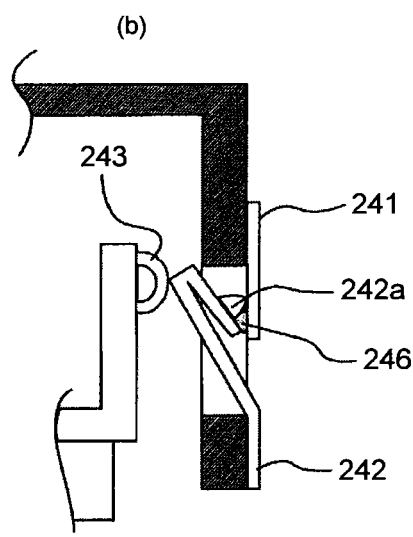
(b)

Related Art

Related Art

LUBRICANT SUPPLYING DEVICE, IMAGE FORMING APPARATUS, AND PROCESS CARTRIDGE

CROSS-REFERENCE TO RELATED APPLICATIONS

The present application claims priority to and incorporates by reference the entire contents of Japanese Patent Application No. 2012-062590 filed in Japan on Mar. 19, 2012 and Japanese Patent Application No. 2012-170168 filed in Japan on Jul. 31, 2012.

BACKGROUND OF THE INVENTION

1. Field of the Invention

The present invention relates to a lubricant supplying device, an image forming apparatus, and a process cartridge.

2. Description of the Related Art

In image forming apparatuses such as printers, facsimiles, and copying machines, the image forming apparatuses have been known that include lubricant supplying devices supplying lubricant to surfaces of image carriers for protection or reducing friction of photosensitive elements serving as lubricant supply targets and intermediate transfer belts serving as image carriers (e.g., Japanese Patent Application Laid-open No. 2007-293240).

FIG. 20 is a schematic structural view of a lubricant supplying device described in Japanese Patent Application Laid-open No. 2007-293240. FIG. 20(a) illustrates a state at the beginning of use. FIG. 20(b) illustrates a state at which solid lubricant 162 is exhausted. FIG. 20 illustrates a structure on one end side in a longitudinal direction of the solid lubricant 162. The other end side also has the same structure. As illustrated in FIG. 20(a), the lubricant supplying device described in Japanese Patent Application Laid-open No. 2007-293240 includes a supplying member 161 that abuts the solid lubricant 162 having a bar shape, scrapes the solid lubricant 162 by making a sliding contact with and rubbing the solid lubricant 162, and supplies the powdered lubricant after the scraping to an image carrier. In addition, the lubricant supplying device includes a pushing mechanism 163 that pushes the solid lubricant 162 and a lubricant holding member 164 toward the supplying member 161. The lubricant holding member 164 holds a side of the solid lubricant 162 opposite the side with which the solid lubricant 162 abuts the supplying member 161 and is provided in a case 165 of the lubricant supplying device such that the lubricant holding member 164 can approach to and leave from the supplying member 161.

The pushing mechanism 163 has a pair of swing members 163A, one end side of each of which is supported by the lubricant holding member 164 in a rotatable manner, disposed symmetrically about the center in the longitudinal direction of the solid lubricant 162 (the swing member 163A disposed on the other end side in the longitudinal direction of the lubricant holding member 164 is not illustrated). Respective both ends of a spring 163C serving as a biasing unit are attached to the swing members 163A. Each swing member 163A receives from the spring 163C a biasing force acting toward the center in the longitudinal direction of the lubricant holding member 164 as illustrated with arrow D in FIG. 20(a). The biasing force urges the other end side (hereinafter referred to as a swing end) of each swing member 163A to leave from the lubricant holding member 164 as illustrated in FIG. 20(a), resulting in the swing end abutting a surface 165A facing the lubricant holding member 164 of the case 165. The lubricant holding member 164 abuts the supplying member 161 with a certain abutting force by being pushed toward the supplying member 161 by a reaction force of a pushing force of the swing members 163A (force acting downward in FIG. 20(a)) applied to the surface 165A of the case 165.

With the rotation of the supplying member 161, the supplying member 161 makes a sliding contact and rubs the solid lubricant 162, which abuts the supplying member 161. Lubricant scraped from the solid lubricant 162 by the sliding contact and rubbing and stuck to the supplying member 161 is applied to a surface of the image carrier. As the solid lubricant 162 is gradually scraped by the sliding contact and rubbing of the supplying member 161, the swing members 163A swing, resulting in the lubricant holding member 162 moving toward the supplying member 161 as illustrated in FIG. 20(b). The solid lubricant 162 continues to abut the supplying member 161 from the beginning to an end stage of use, thereby enabling the supplying member 161 to scrape the solid lubricant 162 well.

When image forming operation is performed without supply of lubricant, the image carrier is damaged by being worn because no protective action of the lubricant is provided. Japanese Patent Application Laid-open No. H8-314346 describes a lubricant supplying device that detects a near-end of lubricant. FIG. 21 is a schematic perspective view illustrating a lubricant near-end detecting unit of the lubricant supplying device described in Japanese Patent Application Laid-open No. H8-314346. As illustrated in FIG. 21, the lubricant near-end detecting unit includes a lubricant holding member 173 that holds solid lubricant 170 and has electrical conductivity, and a first electrode member 181 that abuts one end of the lubricant holding member 153 and a second electrode member 182 that abuts the other end of the lubricant holding member 173 at time when an amount of the remaining lubricant is small. The first electrode member 181 and the second electrode member 182 connect to a detecting circuit 183, which is connected to a display circuit 184 and applies a voltage between the electrode members 181 and 182 and detects whether a current flows. The lubricant holding member 173 is urged by springs 172 to abut a supplying member (not illustrated).

At the beginning of use, the lubricant holding member 173 and the electrode members 181 and 182 have a distance therebetween and thus no current flows between the electrode members. As the solid lubricant 170 is gradually scraped by the supplying member (not illustrated) making a sliding contact with and rubbing the solid lubricant 170, the lubricant holding member 173 moves toward the supplying member by a biasing force of the springs 172. At the near-end of the solid lubricant 170, the conductive lubricant holding member 173 abuts the first electrode member 181 and the second electrode member 182. As a result, a current flows between the electrode members 181 and 182, and the detecting circuit 183 detects the near-end of the solid lubricant 170.

In the lubricant near-end detecting unit of the lubricant supplying device described in Japanese Patent Application Laid-open No. H8-314346, the lubricant holding member just abuts the electrode members and establishes conduction therebetween at time when an amount of the remaining lubricant is small. The lubricant holding member and the electrode members have a distance therebetween during a period until an amount of the remaining lubricant becomes small from the beginning of use. Accordingly, during the period of time until an amount of the remaining lubricant becomes small, the lubricant may stick to areas of the electrode members where the electrode members abut the lubricant holding member and areas of the lubricant holding member where the lubricant holding member abuts the electrode members. The lubricant stuck to the abutting areas hinders conduction from being established in the abutting areas though the lubricant holding member and the electrode members are abutted. As a result, the near-end of the lubricant may not be detected.

Particularly, the lubricant holding member, which holds the solid lubricant, is disposed under an environment in which the lubricant readily sticks to the lubricant holding member. Accordingly, an amount of lubricant stuck to the areas of the lubricant holding member where the lubricant holding member abuts the electrode members becomes large, thereby readily causing misdetection to occur due to the sticking of lubricant.

In view of the above, there is a need to provide a lubricant supplying device that can reliably detect that an amount of the remaining solid lubricant is equal to or smaller than a certain amount, and an image forming apparatus and a process cartridge using the lubricant supplying device.

SUMMARY OF THE INVENTION

It is an object of the present invention to at least partially solve the problems in the conventional technology.

A lubricant supplying device includes: lubricant; a supplying member that supplies the lubricant to a lubricant supply target; and a remaining amount detecting unit that detects that a remaining amount of the lubricant is equal to or smaller than a certain amount. The remaining amount detecting unit includes a first electrode member and a second electrode member. The lubricant supplying device further comprises a member that causes at least a part of the second electrode member to move and causes the second electrode member to abut the first electrode member with an increase in consumption of the lubricant.

A lubricant supplying device includes solid lubricant and applies lubricant of the solid lubricant to a lubricant apply target by a supplying member. The lubricant supplying device includes: a member that causes at least a part of a second electrode member to abut a first electrode member in a remaining amount detecting unit detecting that the solid lubricant is equal to or smaller than a certain amount by detecting conduction between the first electrode member and the second electrode member facing the first electrode member.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a schematic structural view illustrating the lubricant supplying device illustrated in FIG. 5 at an end stage of use;

FIG. 7 is a schematic structural view of the lubricant supplying device including a remaining amount detecting mechanism;

FIG. 8 is a schematic diagram illustrating a state of a near-end of solid lubricant;

FIG. 19 is a schematic diagram illustrating the fourth modification of the lubricant supplying device;

DETAILED DESCRIPTION OF THE PREFERRED EMBODIMENTS

Figure 1:
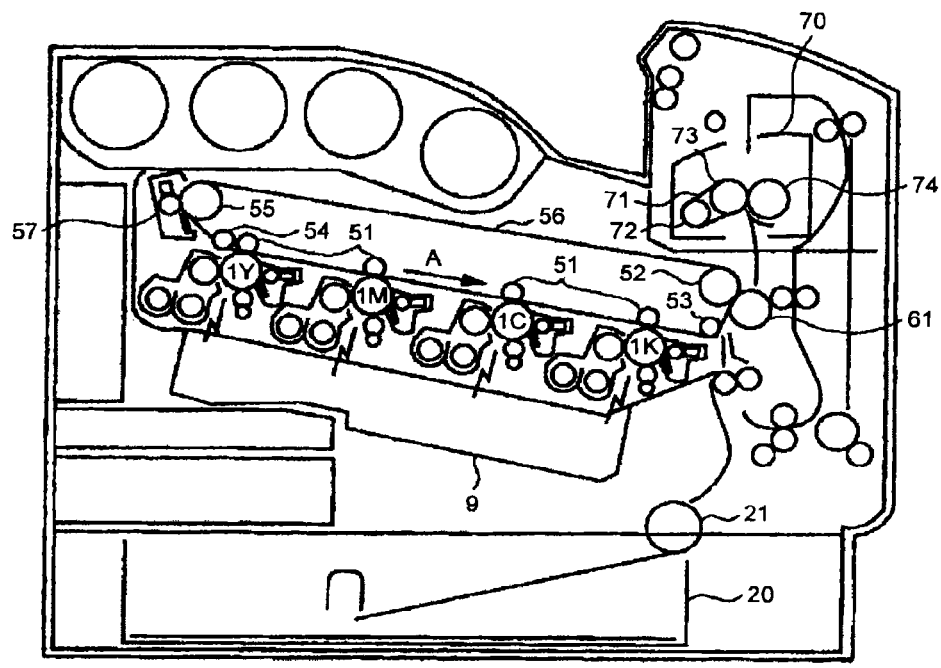
FIG. 1 is a schematic structural view illustrating a printer according to an embodiment of the present invention.

An embodiment in which the invention is applied to a printer serving as an electrophotographic image forming apparatus is described below. FIG. 1 is a schematic structural view illustrating a printer according to the embodiment. The printer includes an intermediate transfer belt 56 serving as an intermediate transfer body and an image carrier at about a central portion therein. The intermediate transfer belt 56 is an endless belt having a mid-resistance base made of a heat resistance material such as polyimide or polyamide, winded along and supported by four rollers 52, 53, 54, and 55, and is driven to rotate in a direction of arrow A in FIG. 1. Under the intermediate transfer belt 56, four image forming units corresponding to respective colors of yellow (Y), magenta (M), cyan (C), and black (K) are arranged along a surface of the intermediate transfer belt 56.

Figure 2:
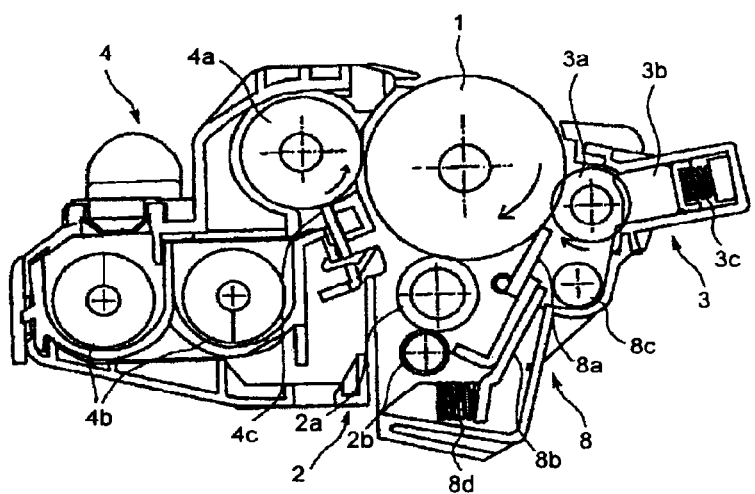
FIG. 2 is an enlarged schematic diagram illustrating one of four image forming units.

FIG. 2 is an enlarged schematic diagram illustrating one of the four image forming units. Each image forming units has the same structure. Thus, the indexes indicating the respective colors of Y, M, C, and K are omitted. Each image forming unit has a photosensitive element 1 serving as an image carrier. Around the photosensitive element 1, a charging device 2 that serves as a charging unit uniformly charging a surface of the photosensitive element 1 to have a desired potential (negative polarity), a developing device 4 that serves as a developing unit developing a latent image formed on the surface of the photosensitive element 1 with toner of a corresponding color of the respective colors charged to a negative polarity and forming a toner image, a lubricant supplying device 3 that serves as a lubricant supplying unit supplying lubricant to the surface of the photosensitive element 1 by applying the lubricant to the surface, and a cleaning device 8 that cleans the surface of the photosensitive element 1 after the toner image is transferred are arranged.

The image forming unit is structured as a process cartridge that is attachable to and detachable from the image forming apparatus. Thus, the photosensitive element 1, the charging device 2, the developing device 4, the cleaning device 8, and the lubricant supplying device 3 are attached to or detached from the image forming apparatus at once.

As illustrated in FIG. 1, an exposing device 9 that serves as a static latent image forming unit exposing the charged surfaces of the respective photosensitive element 1 on the basis of image data of the respective colors to drop potential of the exposed areas and to form static latent images is provided under the image forming units. Primary transfer rollers 51 that serve as a transfer unit primarily transferring toner images formed on the respective photosensitive elements 1 onto the intermediate transfer belt 56 are arranged at respective positions facing the corresponding photosensitive elements 1 with the intermediate transfer belt 56 interposed therebetween. The primary transfer rollers 51 connect to a power supply (not illustrated), which supplies a certain voltage to the primary transfer rollers 51.

A secondary transfer roller 61 serving as a secondary transfer member makes contact with the intermediate transfer belt 56 with pressure at a position opposite the roller 52 with the intermediate transfer belt 56 interposed therebetween. The secondary transfer roller 61 connects to a power supply (not illustrated), which supplies a certain voltage to the secondary transfer roller 61. An area in which the secondary transfer roller 61 and the intermediate transfer belt 56 make contact with each other is a secondary transfer area, in which a toner image on the intermediate transfer belt 56 is transferred to a transfer sheet serving as a recording material. An intermediate transfer belt cleaning device 57 is disposed at a position opposite the roller 55 with the intermediate transfer belt 56 interposed therebetween and cleans the surface of the intermediate transfer belt 56 after the secondary transfer. Above the secondary transfer area, a fixing device 70 is provided that fixes the toner image, which is transferred on the transfer sheet, on the transfer sheet. The fixing device 70 includes a heating roller 72 having a halogen heater therein, an endless fixing belt 71 winded between the heating roller 72 and a fixing roller 73, and a pressing roller 74 that is disposed opposite the fixing roller 73 with the fixing belt 71 interposed therebetween and makes contact with the fixing roller 73 with pressure. At lower area of the printer, a paper feeding device 20 and a roller 21 are provided to feed transfer sheets placed in the paper feeding device 20 toward the secondary transfer area.

The photosensitive element 1, which is an organic photosensitive element, has a surface protective layer formed with a polycarbonate resin. The charging device 2 includes a roller charging device 2a as a charging member composed of a conductive cored bar and a mid-resistance elastic layer coating the outer periphery of the conductive cored bar. The roller charging device 2a connects to a power supply (not illustrated), which supplies a certain voltage to the roller charging device 2a. The roller charging device 2a is disposed so as to have a tiny gap between itself and the photosensitive element 1. The tiny gap can be provided by winding a spacer having a fixed thickness on non-image forming areas at both ends of the roller charging device 2a and by abutting a surface of the spacer to the surface of the photosensitive element 1, for example. The roller charging device 2a is provided with charge cleaning member 2b that makes contact with and cleans the surface of the roller charging device 2a.

In the developing device 4, a developing sleeve 4a that includes a magnetic field generation unit therein and serves as a developer carrier is disposed at a position facing the photosensitive element 1. Under the developing sleeve 4a, two screws 4b are provided that mix toner supplied from a toner bottle (not illustrated) with developer and scoop the mixture to the developing sleeve 4a while stirring the mixture. The developer containing toner and magnetic carrier scooped by the developing sleeve 4a is regulated by a doctor blade 4c so as to form a developer layer having a certain thickness and thereafter carried by the developing sleeve 4a. The developing sleeve 4a moves in the same direction as the photosensitive element 1 at the position at which the developing sleeve 4a encounters the photosensitive element 1 and carries and conveys the developer, supplying toner to a static latent image on the photosensitive element 1. FIG. 1 illustrates the structure of the developing device 4 employing a two-component developing method. The developing device 4, however, is not limited to employing the method. A developing device employing a one-component developing method is also applicable.

The lubricant supplying device 3 includes solid lubricant 3b housed in a fixed case and an applying roller 3a that is a supplying member included in an applying unit applying powdered lubricant scraped from the solid lubricant 3b to the surface of the photosensitive element 1. The present invention is not limited to use of the solid lubricant and powdery lubricant may be used. Examples of the roller that can be used as the applying roller 3a include a brush roller and an urethane foam roller. When the brush roller is used as the applying roller 3a, a brush roller is preferable that is made of a material obtained by adding a resistance control material such as carbon black to a resin such as nylon or acrylic and by being adjusted to have a volume resistivity from $1 \times 10^3$ Ωcm to $1 \times 10^8$ Ωcm inclusive. The rotational direction of the applying roller 3a is opposite to the rotational direction of the photosensitive element 1. Accordingly, in an area in which the photosensitive element 1 and the applying roller 3a are abutted to each other, the surface moving direction of the applying roller 3a is opposite to the surface moving direction of the photosensitive element 1.

The solid lubricant 3b is formed in a cuboid shape and is pushed toward the applying roller 3a by a pushing mechanism 3c, which is described later. Lubricant containing at least a fatty acid metal salt is used as the lubricant of the solid lubricant 3b. Examples of the fatty acid metal salt include a fluorine series resin, fatty acid metal salt having a lamella crystal structure such as zinc stearate, calcium stearate, barium stearate, aluminum stearate, and magnesium stearate, lauroyl lysine, sodium zinc salt of monocetyl phosphate ester, and calcium lauroyl taurine. Among the examples of the fatty acid metal salt, zinc stearate is particularly preferably used. It is because zinc stearate has very good extensibility on the surface of the photosensitive element 1 and low moisture absorbency, and furthermore its lubricity hardly deteriorates even when humidity changes. Accordingly, a protective lubricant film layer can be formed that is hardly affected by environmental change and has a high ability of protecting a surface of a photosensitive element, thereby enabling the surface of the photosensitive element to be protected well. In addition, zinc stearate can markedly reduce cleaning defects because its lubricity hardly deteriorates. In addition to the fatty acid metal salts, liquid materials such as silicone oils, fluorochemical oils, natural waxes and gaseous materials can be added as external additives.

The lubricant of the solid lubricant 3b preferably contains boron nitride, which is inorganic lubricant. Boron nitride can take different crystal structures, including hexagonal boron nitride (h-BN) in a low pressure phase and cubic boron nitride (c-BN) in a high pressure phase. A crystal of hexagonal boron nitride in a low pressure phase has a layered structure and is readily cleaved. Its friction coefficient can be kept smaller than about 0.2 up to at nearly 400° C. In addition, boron nitride hardly changes its characteristics by being subjected to discharge and does not loose lubricity even if it is subjected to discharge while other lubricant loses lubricity. The addition of such boron nitride prevents the lubricant formed on the surface of the photosensitive element 1 as a thin film by being supplied thereon from deterioration in a short period of time due to discharge occurring when the charging device 2 or the primary transfer rollers 51 operates. Boron nitride hardly changes its characteristic by discharge and does not lose lubricity even if it is subjected to discharge while other lubricant loses lubricity. In addition, boron nitride prevents a photosensitive element layer of the photosensitive element 1 from being oxidized or evaporated by discharge. The addition of boron nitride, which demonstrates its lubricity with a small additive amount, is effective for preventing failures due to the sticking of lubricant to the roller charging device 2a and noises caused by vibration of a cleaning blade 8a.

The solid lubricant 3b of the embodiment is made by compression forming of a lubricant material containing zinc stearate and boron nitride. The forming method of the solid lubricant 3b is not limited to this method. Other forming methods such as melting may be employed. As a result, the solid lubricant 3b can obtain both of the effect of zinc stearate and the effect of boron nitride.

The solid lubricant 3b consistently abuts the applying roller 3a by being pushed by the pushing mechanism 3c while the thickness of the solid lubricant 3b is temporally reduced by being scraped by the applying roller 3a. The applying roller 3a applies the scraped lubricant to the surface of the photosensitive element 1 while rotating. Thereafter, the lubricant applied to the surface of the photosensitive element 1 makes contact with the cleaning blade 8a, and is formed as a thin film by being pushed and extended by the cleaning blade 8a. As a result, the friction coefficient of the surface of the photosensitive element 1 is reduced. The film of the lubricant adhering on the surface of the photosensitive element 1 has a very small thickness and thus does not hinder the charging by the roller charging device 2a.

The cleaning device 8 includes the cleaning blade 8a serving as a cleaning member, a supporting member 8b, a toner collection coil 8c, and a blade pushing spring 8d. The cleaning blade 8a is made by forming rubber such as urethane rubber or silicone rubber in a platy shape. The cleaning blade 8a is disposed in such a manner that its edge abuts the surface of the photosensitive element 1 and removes toner remaining on the surface of the photosensitive element 1 after transfer. The cleaning blade 8a is adhesively attached to and supported by the supporting member 8b made of metal, plastic, or ceramic, for example. The cleaning blade 8a is disposed at a certain angle with respect to the surface of the photosensitive element 1. In addition, the cleaning blade 8a abuts the surface of the photosensitive element 1 with certain pressure and a certain intrusion amount by the blade pushing spring 8d. Any of known cleaning supplies such as a cleaning brush can be used as the cleaning member besides the cleaning blade.

In the embodiment, the lubricant supplying device 3 is disposed downstream from the position at which the photosensitive element 1 faces the primary transfer roller 51 (primary transfer area) and upstream from the cleaning device 8 in the surface moving direction of the photosensitive element 1. This disposition enables lubricant applied to the surface of the photosensitive element by the lubricant supplying device 3 to be extended by the cleaning blade 8a making a sliding contact with and rubbing the surface of the photosensitive element, thereby enabling uneven thicknesses of the lubricant applied to the surface of the photosensitive to be roughly uniformed. Alternatively, the lubricant supplying device 3 may be disposed downstream from the position at which the photosensitive element 1 faces the cleaning device 8 (cleaning position) and upstream from the position at which the photosensitive element 1 faces the charging device 2 (charging position) in the surface moving direction of the photosensitive element 1. In this case, when a neutralization unit that neutralizes the surface of the photosensitive element before the charging processing by the charging device 2 is provided, the lubricant supplying device 3 is disposed upstream from the position at which the photosensitive element 1 faces the neutralization unit (neutralization position). In the embodiment, the lubricant supplying device 3 is provided in the cleaning device 8. As a result, toner adhering to the applying roller 3a when the applying roller 3a makes a sliding contact with and rubs the photosensitive element 1 can be shaken off by the solid lubricant 3b or a flicker (not illustrated) and readily collected by the toner collection coil 8c together with toner collected by the cleaning blade 8a.

Figure 3:
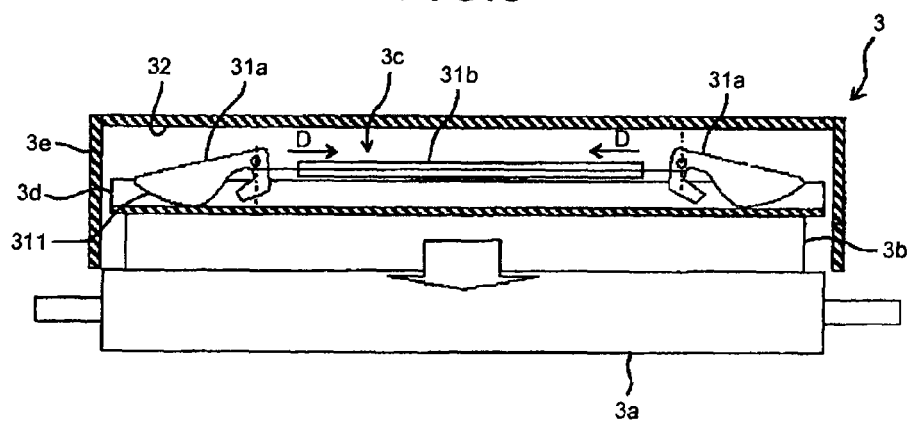
FIG. 3 is a schematic structural view of a lubricant supplying device.

The lubricant supplying device 3 is described below in more detail. FIG. 3 is a schematic structural view of the lubricant supplying device 3. As illustrated in FIG. 3, a lubricant holding member 3d is provided that holds along the longitudinal direction of the solid lubricant 3b a portion of the solid lubricant 3b opposite the surface with which the solid lubricant 3b abuts the applying roller 3a (the surface on the lower side in FIG. 3). The lubricant holding member 3d is provided in a housing case 3e such that the lubricant holding member 3d can approach to and leave from the applying roller 3a. In addition, the pushing mechanism 3c that pushes the solid lubricant 3b to the supplying member is provided in a space above the lubricant holding member 3d in the housing case 3e.

The pushing mechanism 3c has swing members 31a that are provided one each near both ends in the longitudinal direction of the lubricant holding member 3d and attached to the housing case 3e swingably, and a spring 31b serving as a biasing unit. Respective both ends of the spring 31b are attached to the swing members 31a. Each swing member 31a receives from the spring 31b a biasing force acting toward the center in the longitudinal direction of the lubricant holding member 3d as indicated with arrow D in FIG. 3. The biasing force urges the swing member 31a on the right side to swing counterclockwise in FIG. 2 and the swing member 31a on the left side to swing clockwise in FIG. 2. As a result, an arc-like abutting portion 311 abutting the lubricant holding member 3d of each swing member 31a is urged to push the lubricant holding member 3d as illustrated in FIG. 3.

At the beginning of use, a swing end of each swing member 31a swings so as to approach to an inner surface 32 of an upper surface portion of the housing case 3e against the biasing force of the spring 31b. In the structure thus described, the swing members 31a evenly push the lubricant holding member 3d by the biasing force of the spring 31b, thereby pushing the solid lubricant 3b held by the lubricant holding member 3d to the applying roller 3a. Accordingly, the solid lubricant 3b is evenly pushed to the applying roller 3a along the longitudinal direction of solid lubricant 3b. As a result, an amount of lubricant scraped by the rotation of the applying roller 3a making a sliding contact with and rubbing the lubricant is uniformed in the longitudinal direction of the solid lubricant 3b, thereby enabling the lubricant to be applied to the surface of the photosensitive element 1 without having uneven thicknesses.

Figure 4:
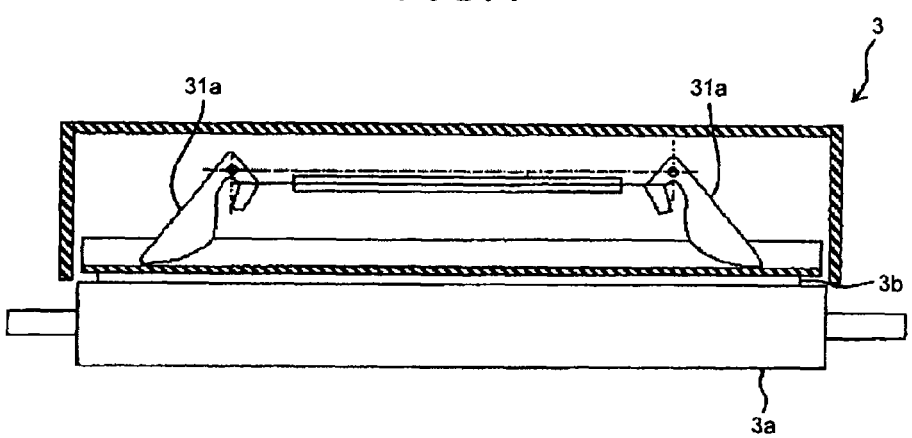
FIG. 4 is a schematic structural view of the lubricant supplying device at an end stage of use.

FIG. 4 is a schematic structural view of the lubricant supplying device 3 at a near-end stage of use (an amount of the remaining lubricant is small). As the solid lubricant 3b is gradually scraped by the applying roller 3a making a sliding contact with and rubbing the solid lubricant 3b, the swing members 31a swing, causing the lubricant holding member 3d to move toward the applying roller 3a. Finally, when an amount of the solid lubricant 3b is small as illustrated in FIG. 4, the swing ends of the swing members 31a abut the lubricant holding member 3d.

The pushing mechanism 3c of the embodiment can prevent the pushing force of the solid lubricant 3b from being reduced when the height of the solid lubricant 3b is reduced in a long period of use. As a result, a fluctuation in amount of powdered lubricant supplied to the surface of the photosensitive element 1 can be controlled in a small range from the beginning to the end of use.

The reason why such a small fluctuation can be achieved is as follows. In general, the longer the whole length of the spring, the smaller the fluctuation in biasing force of the spring in relation to an amount of change in elongation of the spring from the beginning to the end of use of the solid lubricant 3b. In the conventional pushing mechanism, the springs are arranged in a compressed state and also in such a manner that the direction of the biasing force (pushing force) of the springs coincides with the pushing direction of the solid lubricant 3b to the applying roller 3a. In such a structure, the longer the whole lengths of the respective springs, the more difficult the direction of the biasing force of the springs and the pushing direction of the solid lubricant 3b to the applying roller 3a coincides with each other, thereby limiting the whole lengths of the respective springs to a certain range. In addition, the conventional pushing mechanism needs a space corresponding to the whole lengths of the respective springs in a radial direction of the applying roller 3a to arrange the springs, resulting in an increase in size of the apparatus. Because of the reasons described as above, the conventional pushing mechanism needs the springs having relatively short lengths to use, thereby increasing the fluctuation in biasing force of the springs as time elapses.

In contrast, in the pushing mechanism 3c of the embodiment, the spring 31b is disposed in an extended state as illustrated in FIG. 3 and the solid lubricant 3b can be pushed to the applying roller 3a using the biasing force (tension) of the spring 31b. Accordingly, the elongation of the whole length of the spring 31b does not cause such a problem of the conventional pushing mechanism. In addition, in the pushing mechanism 3c of the embodiment, the spring 31b is disposed in such a manner that the longitudinal direction of the spring 31b coincides with the longitudinal direction of the solid lubricant 3b. i.e., the axial direction of the applying roller 3a. Accordingly, the elongation of the whole length of the spring 31b needs no extra space to dispose the spring 31b in the radial direction of the applying roller 3a, thereby not requiring the apparatus to increase in size. Because of this reason, the pushing mechanism 3c of the embodiment can use the spring 31b having a much longer length than that of the spring used in the conventional pushing mechanism. As a result, the temporal fluctuation in biasing force of the spring can be reduced to a small range.

Figure 5:
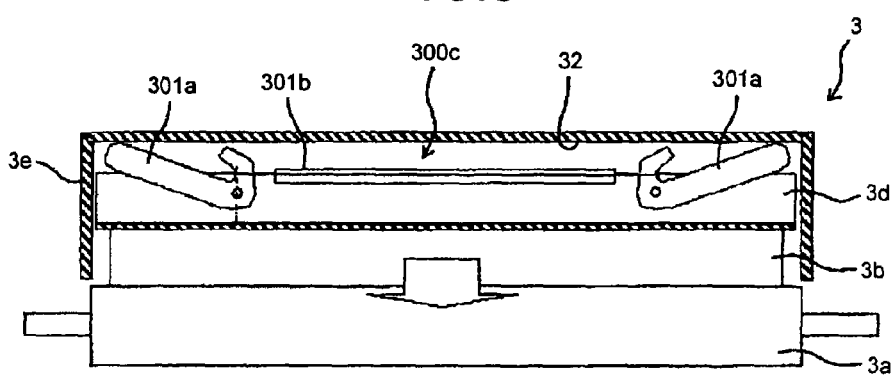
FIG. 5 is a schematic structural view of the lubricant supplying device including a pushing mechanism of a modification.

FIG. 5 is a schematic structural view of the lubricant supplying device including a pushing mechanism of a modification. In a pushing mechanism 300c of the modification, swing members 301a are attached to the lubricant holding member 3d swingably. As a result, the swing end of each swing member 301a is urged to leave from the lubricant holding member 3d by a biasing force of a spring 301b acting toward the center in the longitudinal direction of the lubricant holding member 3d and the swing end of each swing member 301a abuts the inner surface 32 of the upper surface portion of the housing case 3e.

At the beginning of use as illustrated in FIG. 5, the swing end of each swing member 301a swings so as to approach to the lubricant holding member 3d against the biasing force of the spring 301b. In this modification, the swing members 301a evenly push the inner surface 32 of the upper face portion of the housing case 3e by the biasing force of the spring 301b, thereby pushing the solid lubricant 3b held by the lubricant holding member 3d to the applying roller 3a. Also in the modification, as the solid lubricant 3b is gradually scraped by the applying roller 3a making a sliding contact with and rubbing the solid lubricant 3b, the swing members 301a swing, causing the lubricant holding member 3d to move toward the applying roller 3a. Finally, when an amount of the solid lubricant 3b is small, the swing members 301a swing in a state as illustrated in FIG. 6.

A remaining amount detecting mechanism 40 that serves as a remaining amount detecting unit detecting a near-end of the solid lubricant, which is an advantageous feature of the embodiment, is described below.

As described above, in the remaining amount detecting unit described in Japanese Patent Application Laid-open No. H8-314346, lubricant may stick to an area of the electrode member where the electrode member abuts the lubricant holding member and an area of the lubricant holding member where the lubricant holding member abuts the electrode member. The lubricant, which is an insulating material, is charged due to a friction with the applying roller when the lubricant is scraped by the applying roller or a friction with the photosensitive element when the powdered lubricant stuck to the applying roller is applied to the photosensitive element, for example. When a voltage is applied to the electrode member and the lubricant holding member for detecting an amount of the remaining lubricant (also referred to as a remaining amount of lubricant), the triboelectrically charged lubricant is electrically stuck to the lubricant holding member and the electrode member. Accordingly, in a structure in which the remaining amount of lubricant is detected by presence or absence of electrical conduction, the lubricant readily sticks to an area of the electrode member where the electrode member abuts the lubricant holding member and an area of the lubricant holding member where the lubricant holding member abuts the electrode member, thereby increasing the possibility that the near-end of the lubricant may not be detectable. The following structure may prevent the lubricant from sticking to an area of the electrode member where the electrode member abuts the lubricant holding member and an area of the lubricant holding member where the lubricant holding member abuts the electrode member. Specifically, in the structure, openings are provided one each to side walls at both ends in the longitudinal direction of the housing case housing the lubricant holding member in a movable manner, and both ends of the lubricant holding member project though the respective openings. In addition, the electrode member is provided outside the housing case and abuts the lubricant holding member outside the housing case. Even in such a structure, toner lubricant may scatter from the openings of the housing case and may stick to an area of the electrode member where the electrode member abuts the lubricant holding member and an area of the lubricant holding member where the lubricant holding member abuts the electrode member.

The inventors of the present invention proposed in Japanese Patent Application No. 2010-252621 (hereinafter, referred to as the earlier application) a lubricant supplying device detecting that an amount of remaining lubricant is small (detecting a near-end) by the following manner. In the lubricant supplying device in the earlier application, electrode members are provided one each to areas, which swing members abut, on a surface, which faces a lubricant holding member, of a housing case. In addition, the swing members and a spring have conductivity and joints between the swing members and the spring are released when the swing members swing over certain limits.

At the beginning of use, a current flows from one electrode member to the other electrode member through one swing member, the spring, and the other swing member, i.e., a conduction state is established. As the solid lubricant is scraped, the swing members swing as described above. When the thickness of the solid lubricant is equal to or smaller than a certain thickness, i.e., the remaining amount of the lubricant is small, the spring comes off from the swing members. As a result, the conduction state turns to a non-conduction state, thereby detecting the near-end of the lubricant.

The lubricant supplying device in the earlier application, however, has a problem in that currents consistently flow for watching whether the remaining amount of the lubricant is the near-end (change from the conduction state to the non-conduction state) and thus lubricant supplying device consumes extra electric power.

The remaining amount detecting mechanism 40 of the embodiment can reliably detect that the remaining amount of the solid lubricant is equal to or smaller than a certain amount and can reduce power consumption. The description is made more specifically below.

FIG. 7 is a schematic structural view illustrating a structure of the lubricant supplying device 3 including the pushing mechanism 3c illustrated in FIGS. 3 and 4 and the remaining amount detecting mechanism 40 of the embodiment. As illustrated in FIG. 7, the remaining amount detecting mechanism 40 includes a first electrode member 41, second electrode members 42, and pushing members 43 that cause the second electrode members 42 to abut the first electrode member 41. The first electrode member 41 is disposed so as to face an outer surface 33 of the upper surface portion, which is the surface portion facing an upper surface of the lubricant holding member 3d, of the housing case 3e with a certain gap therebetween. Openings 34a are provided one each to near both ends in the longitudinal direction of the upper surface portion of the housing case 3e. The second electrode members 42, which are elastically deformable, are provided so as to cover the respective openings 34a. The pushing member 43 is attached to each swing member 31a so as to be projected from the edge on the swing fulcrum side of the swing member 31a. One end of the second electrode member 42 is fixed to the outer surface 33 of the upper surface portion of the housing case 3e with an adhesive, for example.

An electrical resistance detecting unit 44 serving as a voltage applying unit connects to the first electrode member 41 and the second electrode members 42. The electrical resistance detecting unit 44 connects to a control unit 100 that controls the electrical resistance detecting unit 44. The electrical resistance detecting unit 44 applies a voltage between the first electrode member 41 and the second electrode members 42 and measures an electrical resistance.

At the beginning of use as illustrated in FIG. 7, the pushing members 43 attached to the respective swing members 31a are away from the second electrode members 42. Meanwhile, the first electrode member 41 and the second electrode members 42 have a distance therebetween, i.e., in the non-conduction state. Even if the electrical resistance detecting unit 44 applies a voltage between the first electrode member 41 and the second electrode members 42, no current flows between the first electrode member 41 and the second electrode members 42. As a result, no electrical resistance value can be measured.

As the solid lubricant 3b is consumed by being scraped, the swing members 31a swing, thereby causing the leading ends of the pushing members 43 to gradually approach to the respective second electrode members 42. As a result, the leading ends of the pushing members 43 abut the respective second electrode members 42. As the lubricant is further consumed, the swing members 31a further swing. As a result, the pushing members 43 push the elastically deformable second electrode members 42 toward the first electrode member 41. The second electrode members 42 pushed by the pushing members 43 toward the first electrode member 41 cause the ends, which are not fixed to the outer surface 33 of the upper surface portion of the housing case 3e, of the second electrode members 42 to leave from the outer surface 33 of the upper surface portion of the housing case 3e. When the remaining amount of the solid lubricant 3b is small (the near-end) as illustrated FIG. 8, the second electrode members 42 abut the first electrode member 41. Once the second electrode members 42 abut the first electrode member 41, the non-conduction state between the first electrode member 41 and the second electrode members 42 turns to the conduction state. When the electrical resistance detecting unit 44 applies a voltage between the first electrode member 41 and the second electrode members 42, a current flows between the first electrode member 41 and the second electrode members 42, and thus the electrical resistance detecting unit 44 measures an electrical resistance value.

The control unit 100, which watches the measurement results of the electrical resistance detecting unit 44, determines the near-end of the lubricant when detecting that the electrical resistance value detected by the electrical resistance detecting unit 44 is equal to or smaller than a certain value. Then, the control unit 100 notifies an operation display unit (not illustrated) of that the remaining amount of the lubricant is small so as to promote a user to replace the lubricant with new lubricant. The control unit 100 may notify a service center of the necessity of replacement of the lubricant, using a communications unit (not limited).

In the remaining amount detecting mechanism 40 of the embodiment, the first electrode member 41 is provided outside the housing case 3e and the first electrode member 41 and the second electrode members 42 are electrically connected outside the housing case 3e. This structure can prevent lubricant from sticking to the areas of the first electrode member 41 where the first electrode member 41 abuts the second electrode members 42 and the respective areas of the second electrode members 42 where the second electrode members 42 abut the first electrode member 41 unlike a structure in which the first electrode member 41 and the second electrode members 42 are electrically connected in the housing case 3e. As a result, the occurrence of a conduction failure between the first electrode member 41 and the second electrode members 42 due to the sticking of lubricant at the near-end of the lubricant can be prevented.

In the embodiment, the second electrode members 42 cover the openings 34a until the second electrode members 42 are pushed toward the first electrode member 41 by the pushing members 43. This structure can prevent lubricant in the housing case 3e from scattering from the openings 34a, thereby further enabling the lubricant to be prevented from sticking to the areas of the first electrode member 41 where the first electrode member 41 abuts the second electrode members 42 and the respective areas of the second electrode members 42 where the second electrode members 42 abut the first electrode member 41.

In the embodiment, the non-conduction state is established between the first electrode member 41 and the second electrode members 42 before the near-end of the amount of the lubricant, and thus no current flows even if a voltage is applied between the electrode members. As a result, no power is consumed at every detection of the near-end, thereby enabling power consumption to be reduced.

In the embodiment, the second electrode members 42 are provided one each to near both left and right ends (near both ends in the longitudinal direction of the solid lubricant 3b) in FIG. 7. Because of the structure, even when a consumption amount of lubricant differs in the longitudinal direction of the solid lubricant 3b and the amount of the lubricant is the near end at one end on a side in which the lubricant is consumed more than the other side, the second electrode member 42 on a side adjacent to the end on the side in which the lubricant is consumed more than the other side, abuts the first electrode member 41 and establishes electric conduction therebetween. That is, this structure enables the near-end of the lubricant to be accurately detected even when the consumption amount of the lubricant differs in the longitudinal direction of the solid lubricant 3b. This prevents occurrence of failures such as scratches on the surface of the photosensitive element occurring when no lubricant protection is provided on the side in which the lubricant is exhausted due to a larger amount of consumption.

In the embodiment, the second electrode members 42 are provided one each to the respective openings 34a and cover the respective openings 34a. The openings 34a may be covered by one of the second electrode members 42. In the embodiment, the second electrode members 42 are elastically deformable. The abutting structure between the second electrode members 42 and the first electrode member 41 is not limited to the use of the elastically deformable members. For example, one end of the second electrode member 42 may be attached to the housing case 3e in a rotatable manner. When pushed by the pushing member 43, the second electrode member 42 thus attached may swing around the attached end and abut the first electrode member 41.

Modifications of the lubricant supplying device are described below.

First Modification

Figure 9:
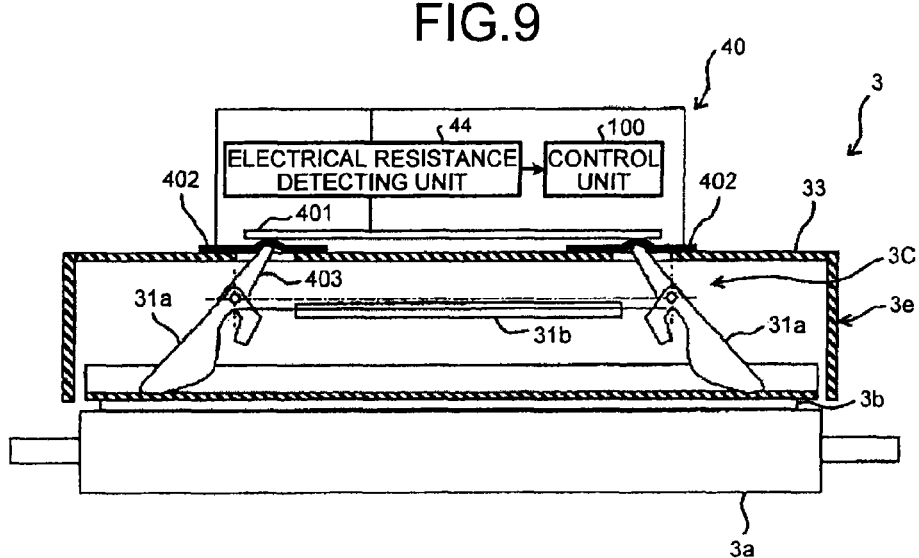
FIG. 9 is a schematic diagram illustrating a first modification of the lubricant supplying device.

FIG. 9 is a schematic structural view illustrating the lubricant supplying device of a first modification. As illustrated in FIG. 9, in the lubricant supplying device of the first modification, second electrode members 402, which are made of an expandable material such as conductive rubber, are permanently fixed to the outer surface 33 of the upper surface portion of the housing case 3e and completely close the openings 34a. In this case, as illustrated in FIG. 9, when the leading ends of pushing members 403 push the second electrode members 402 at the near-end of the solid lubricant 3b, areas of the second electrode members 402 where the second electrode members abut the pushing members 403 made of the expandable material are projected and abut the first electrode member 401. As a result, also in the first modification, the non-conduction state established between the electrode members is changed to the conduction state and the near-end of the lubricant is detected.

In the first modification, the openings 34a completely closed by the second electrode members 402 enable lubricant to be completely prevented from scattering from the openings 34a. As a result, this structure can further prevent lubricant from sticking to the areas of the first electrode member 401 where the first electrode member 401 abuts the second electrode members 402 and the respective areas of the second electrode members 402 where the second electrode members 402 abut the first electrode member 401.

Second Modification

Figure 10:
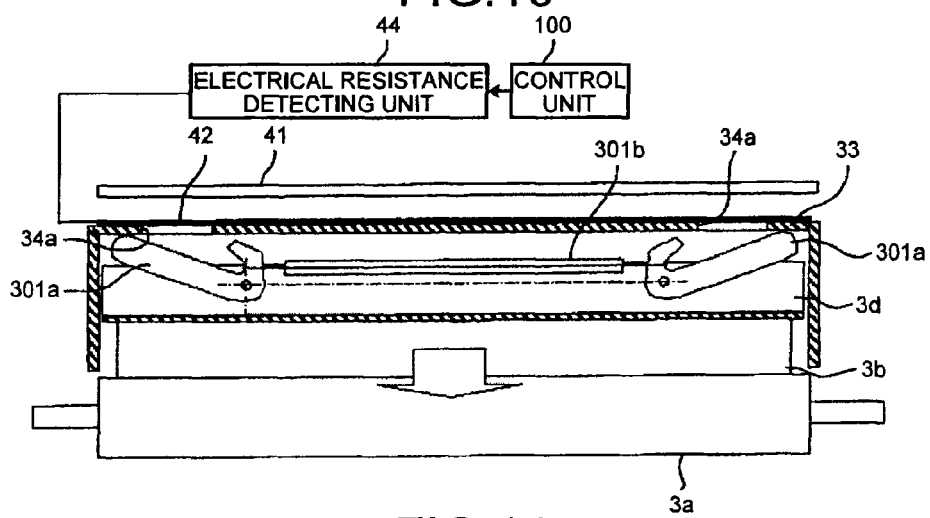
FIG. 10 is a schematic diagram illustrating a second modification of the lubricant supplying device.

FIG. 10 is a schematic structural view illustrating the lubricant supplying device of a second modification. The lubricant supplying device of the second modification is the lubricant supplying device 3 including the pushing mechanism 300c illustrated in FIGS. 5 and 6, and the remaining amount detecting mechanism 40 of the embodiment. In the remaining amount detecting mechanism 40 illustrated in FIG. 10, the second electrode member 42 covers both of the openings 34a. In the remaining amount detecting mechanism 40 illustrated in FIG. 10, the swing members 301a function as the members causing the second electrode member 42 to abut the first electrode member 41. The openings 34a are disposed one each at positions that the leading ends on the swing sides of the swing members 301a reach at the near-end of the solid lubricant 3b.

Figure 11:
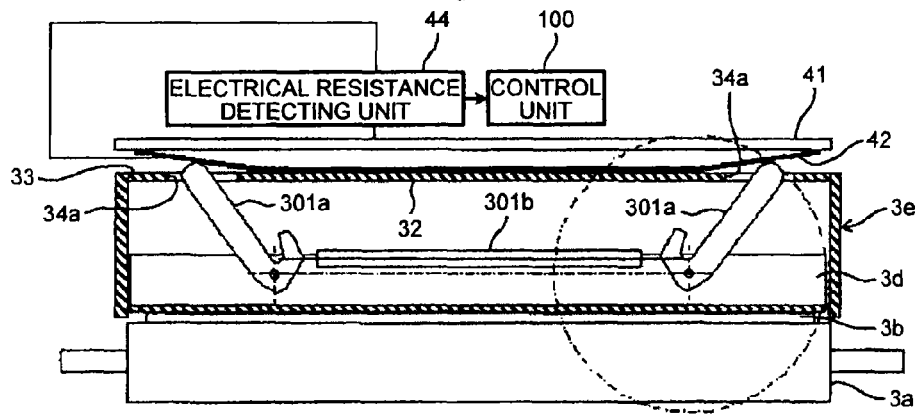
FIG. 11 is a schematic diagram illustrating a state of a near-end of the solid lubricant in the second modification.

In the structure illustrated in FIG. 10, as the solid lubricant 3b is consumed by being scraped, the swing members 301a swing, resulting in the leading ends on the swing sides of the swing members 301a approaching to the respective openings 34a while sliding on the inner surface 32 of the upper surface portion of the housing case 3e. When the remaining amount of the solid lubricant 3b is small (near-end) as illustrated in FIG. 11 as a result of further consumption of the lubricant, the leading ends on the swing sides of the swing members 301a reach the respective openings 34a and abut the second electrode member 42. Once the swing members 301a abut the second electrode member 42, the second electrode member 42 is pushed toward the first electrode member 41 by the biasing force of the spring 301b, resulting in the second electrode member 42 abutting the first electrode member 41. As a result, the non-conduction state established between the electrode members is changed to the conduction state and the near-end of the lubricant is detected.

In the structure illustrated in FIG. 10, the second electrode member 42 covers the openings 34a until the near-end of the lubricant, thereby enabling the lubricant to be prevented from scattering from the openings 34a and the conduction failures due to the sticking of lubricant to be prevented from occurring.

Third Modification

Figure 12:
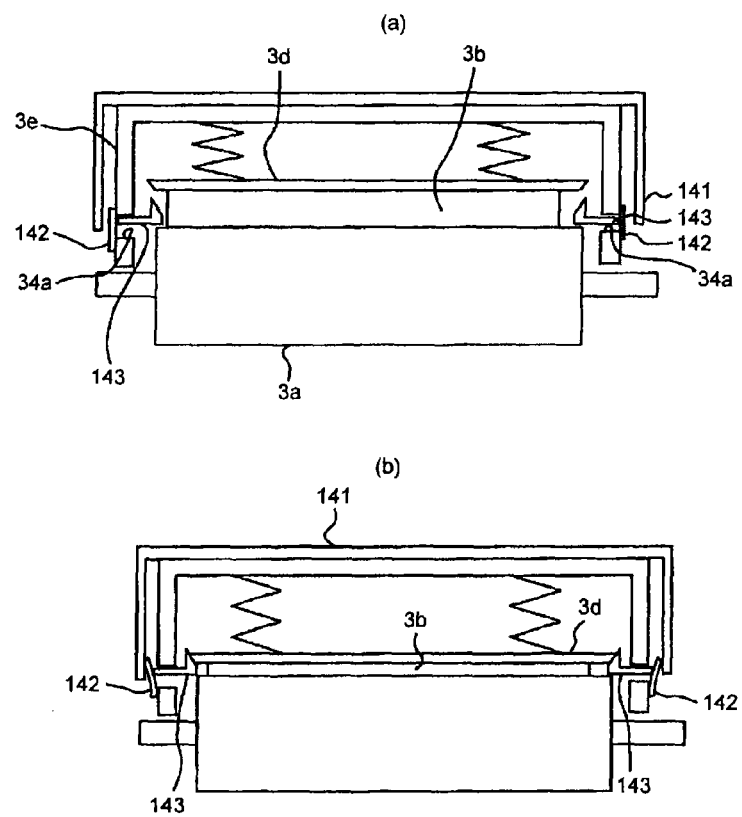
FIG. 12 is a schematic diagram illustrating a third modification of the lubricant supplying device.

FIG. 12 is a schematic structural view illustrating the lubricant supplying device of a third modification. FIG. 12(a) illustrates a state at the beginning of use. FIG. 12(b) illustrates a state at an end stage of use. In the third modification as illustrated in FIG. 12, the openings 34a are provided one each to both side surfaces, which are surface portions facing the respective ends of the lubricant holding member 3b, of the housing case 3e, and second electrode members 142 are provided so as to cover the respective openings 34a. Both ends of the lubricant holding member 3d have inclined surfaces inclined toward the central portion in the longitudinal direction of the solid lubricant 3b. In addition, in the housing case 3e, pushing members 143 are provided between the lubricant holding member 3d and the applying roller 3a in a slidable manner in the longitudinal direction of the solid lubricant 3b. Each pushing member 143 has a projected portion projecting upward in FIG. 12(a) (toward the lubricant holding member 3d) on a side adjacent to the solid lubricant 3b. The projected portion has, on the solid lubricant 3b side, an inclined surface inclined toward the central portion in the longitudinal direction of the solid lubricant 3b.

As the solid lubricant 3b is consumed, the lubricant holding member 3d moves toward the applying roller 3a, resulting in the inclined surfaces at both ends of the lubricant holding member 3d abutting the inclined surfaces of the respective pushing members 143. As a result of further consumption of the solid lubricant 3b, the lubricant holding member 3d pushes the inclined surfaces of the pushing members 143. Upon being pushed, the pushing members 143 move toward the housing case 3e and push the second electrode members 142. At the near-end of the solid lubricant 3b as illustrated in FIG. 12(b), the second electrode members 142 abut the first electrode member 141, thereby changing the non-conduction state established between the electrode members to the conduction state. As a result, the near-end of the lubricant is detected.

In the third modification, the second electrode members 142 cover the openings 34a until the near-end of the lubricant, thereby enabling the lubricant to be prevented from scattering from the openings 34a and the conduction failures due to the sticking of lubricant to be prevented from occurring.

In the embodiment and the first to third modifications, the second electrode members cover the opening 34a of the housing case. Alternatively, the second electrode members may be provided on members covering the opening 34a of the housing case.

Fourth Modification

Figure 13:
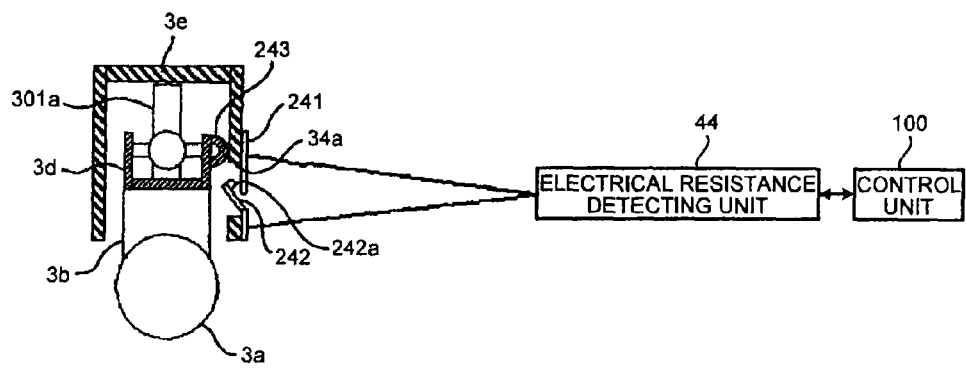
FIG. 13 is a schematic diagram illustrating a fourth modification of the lubricant supplying device.

FIG. 13 is a schematic structural view of the lubricant supplying device of a fourth modification. In the fourth modification, a first electrode member 241 is disposed in such a manner that an upper portion of the first electrode member 241 is fixed to the outer wall of the housing case 3e on the pushing mechanism 3c side from the opening 34a, and the portion, which is not fixed to the outer wall, of the first electrode member 241 covers the upper half of the opening 34a. A second electrode member 242 is disposed in such a manner that a lower portion of the second electrode member 242 is fixed to the outer wall of the housing case 3e on the applying roller 3a side from the opening 34a and the portion, which is not fixed to the outer wall, of the second electrode member 242 covers the lower half of the opening 34a. The second electrode member 242 extends through the opening 34a in the inside of the housing case 3e. The free end of the second electrode member 242 (the upper end in FIG. 13) faces the first electrode member 241 disposed outside the housing case 3e. The lubricant holding member 3d is provided with a pushing portion 243 having a cross-sectional view of an arc-like shape. The free end of the second electrode member 242 (the upper end in FIG. 13) is provided with a projection 242a projecting toward the first electrode member 241.

Figure 14:
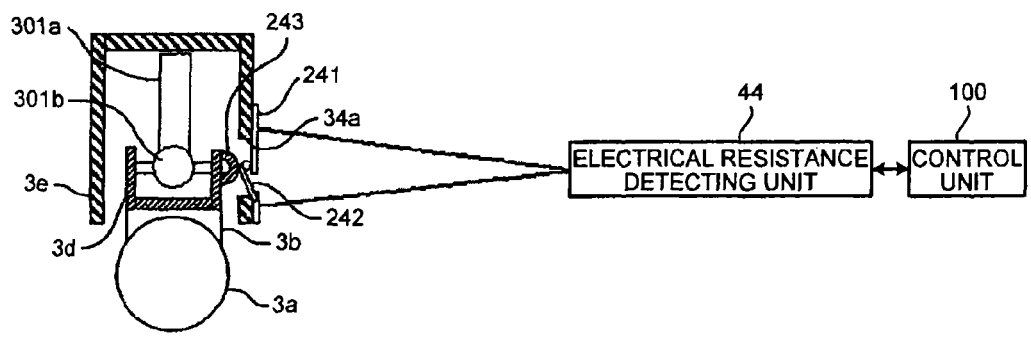
FIG. 14 is a schematic diagram illustrating a state of a near-end of the solid lubricant in the fourth modification.

At the beginning of use as illustrated in FIG. 13, the pushing portion 243 is away from the second electrode member 242, and the second electrode member 242 and the first electrode member 241 have a distance therebetween. As a result of consumption of the solid lubricant 3b, the pushing portion 243 of the lubricant holding member 3d abuts the second electrode member 242, thereby causing the free ends of the second electrode member 242 to move toward the first electrode member 241. At the near-end of the lubricant as illustrated in FIG. 14, the projection 242a of the second electrode member 242 abuts the first electrode member 241, thereby establishing conduction between the electrode members. As a result, the near-end is detected.

Figure 15:
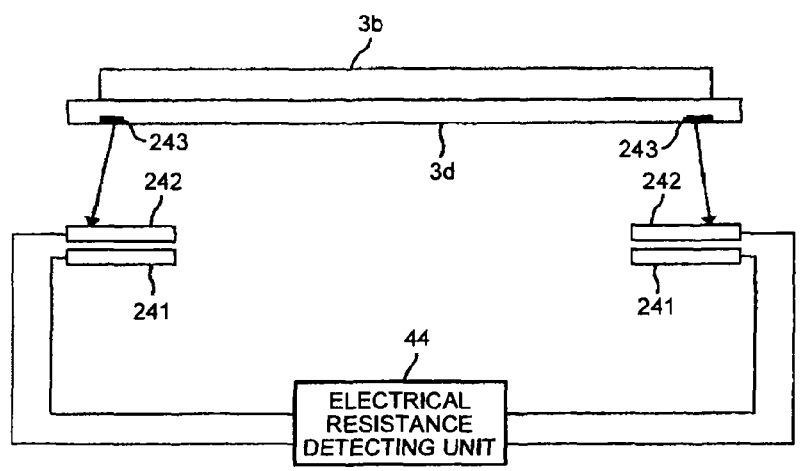
FIG. 15 is a schematic diagram illustrating a resistance detecting unit provided in common with remaining amount detecting mechanisms.
Figure 16:
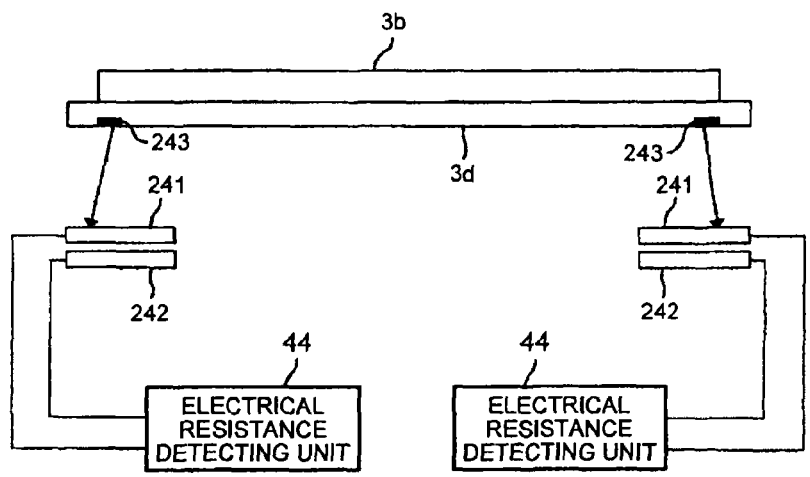
FIG. 16 is a schematic diagram illustrating resistance detecting units provided one each to the respective remaining amount detecting mechanisms.

In the fourth modification, the remaining amount detecting mechanisms are also provided one each to near both ends in the longitudinal direction of the solid lubricant 3b. Accordingly, even when consumption of the lubricant differs in the longitudinal direction of the solid lubricant 3b, the remaining amount detecting mechanism 40 on a side adjacent to the end on a side in which the lubricant is consumed more than the other side can detect the near-end at the end on the side in which the lubricant is consumed more than the other side. As illustrated in FIG. 15, a resistance detecting unit 44 may be provided in common with the remaining amount detecting mechanisms. Alternatively, as illustrated in FIG. 16, the resistance detecting units 44 may be provided one each to the respective remaining amount detecting mechanisms. When the resistance detecting units 44 are provided one each to the respective remaining amount detecting mechanisms as illustrated in FIG. 16, the resistance detecting units 44 can also detect that either end is the near-end in the longitudinal direction of the solid lubricant 3b.

In the fourth modification, the opening 34a is not covered with the second electrode member 242 unlike the embodiment. Accordingly, the lubricant may stick to the area of the first electrode member 241 where the first electrode member 241 abuts the second electrode member 242, for example. However, lubricant powder floating in the housing case 3e does not stick to the first electrode member 241, which is disposed outside the housing case 3e, unless the lubricant powder passes through the opening 34a. As a result, this structure can further prevent lubricant from sticking to the first electrode member 241 than a case in which the first electrode member 241 is disposed in the housing case.

Figure 17A:
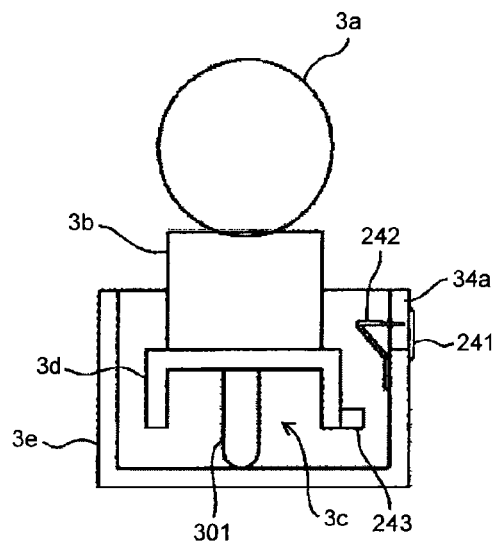
FIGS. 17A and 17B are schematic diagrams illustrating another aspect of the fourth modification.
Figure 17B:
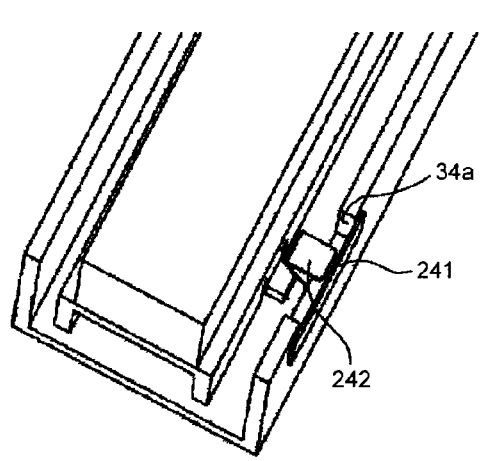

As illustrated in FIGS. 17A and 17B, the second electrode member 242 may be fixed to the inner wall of the housing case 3e. The second electrode member 242 illustrated in FIG. 17A, which is formed by bending a metal plate, is disposed in such a manner that one end of the second electrode member 242 is fixed to the inner wall surface of the housing case 3e on the pushing mechanism 3c side from the opening 34a. A portion extending from the end fixed to the inner wall of the housing case 3e upward in FIG. 17A (toward the applying roller 3a) is inclined inward (toward the solid lubricant 3b). The second electrode member 242 extends toward the second electrode member 241 from the upper end in FIG. 17A of the inclined portion (end on a side adjacent to the applying roller 3a). As illustrated in FIG. 17B, the first electrode member 241 is fixed to the outer wall in the longitudinal direction of the housing case 3e on both sides of the opening 34a. As a result, this structure can further prevent lubricant from sticking to the first electrode member 241 than a case in which the first electrode member 241 is disposed in the housing case.

Figure 18A:
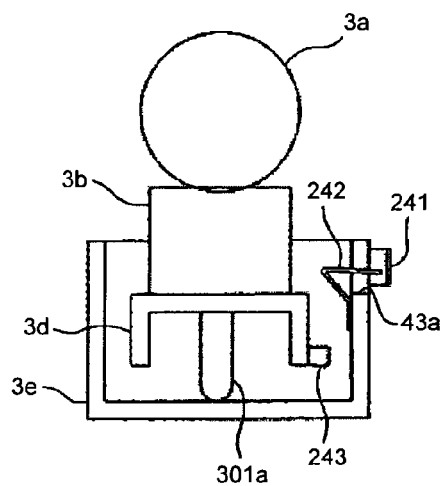
FIGS. 18A and 18B are schematic diagrams illustrating still another aspect of the fourth modification.
Figure 18B:
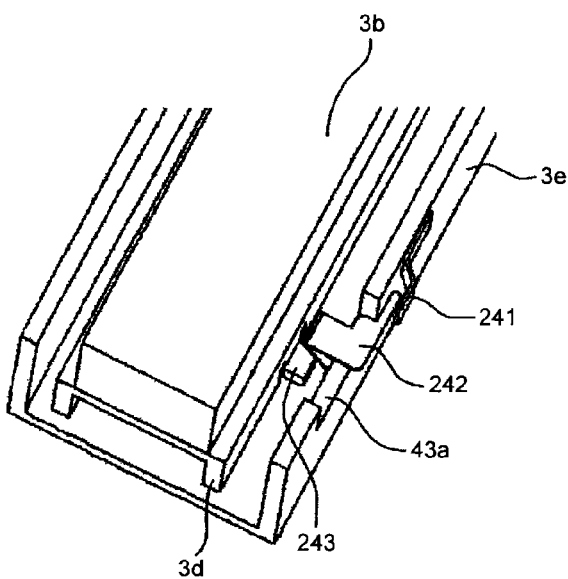
Figure 20:
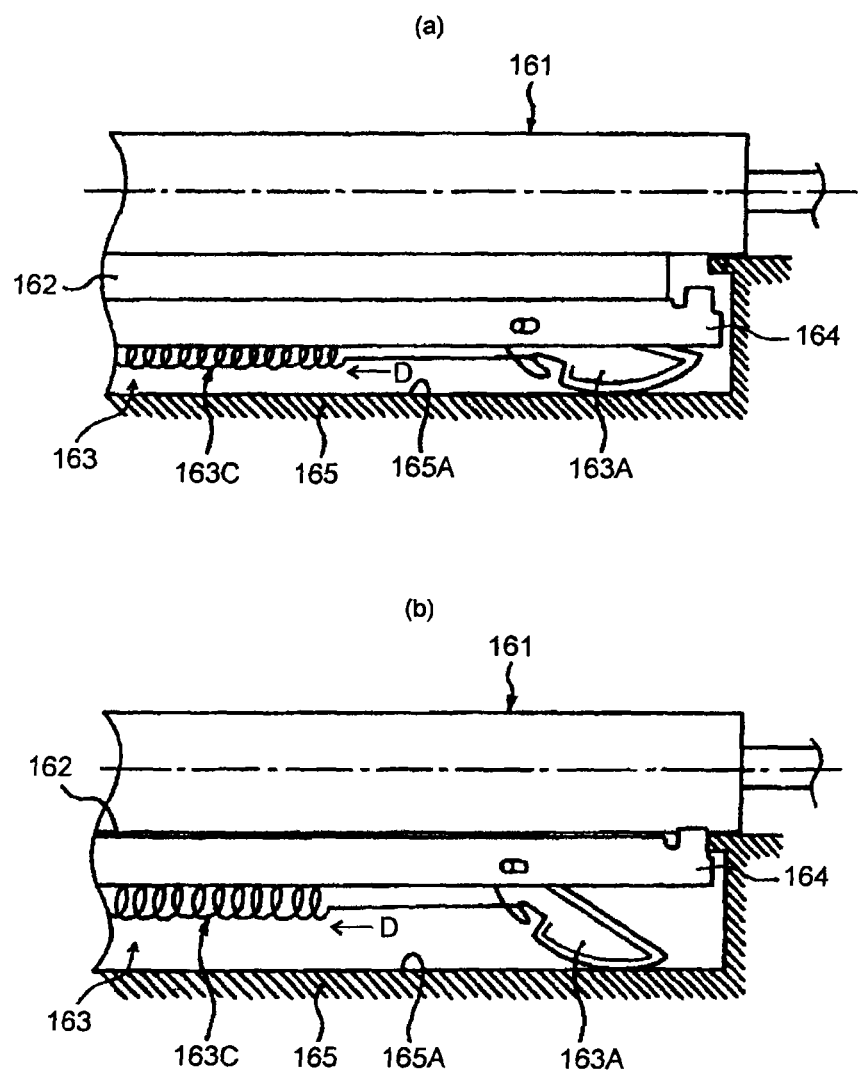
FIG. 20 is a schematic structural view illustrating a conventional lubricant supplying device.

As illustrated in FIGS. 18A and 18B, the second electrode member 242 and the first electrode member 241 are formed and arranged such that the abutting area of second electrode member 242 and the first electrode member 241 does not face the opening 34a. This structure can further prevent lubricant from sticking to the area of the second electrode member 242 where the second electrode member 242 abuts the first electrode member 241 and the area of the first electrode member 241 where the first electrode member 241 abuts the second electrode member 242 than the structures illustrated in FIGS. 13, 17A and 17B.

Fifth Modification

FIG. 19 is a schematic structural view of the lubricant supplying device of a fifth modification. The lubricant supplying device of the fifth modification is structured by adding a cleaning member 246 to the second electrode member 242 of the lubricant supplying device of the fourth modification. The cleaning member 246 cleans the area of the first electrode member 241 where the first electrode member 241 abuts the second electrode member 242. The cleaning member 246 is a sponge, for example.

At the beginning of use as illustrated in FIG. 19(a), only the cleaning member 246 abuts the first electrode member 242. As a result of consumption of the lubricant, the pushing portion 243 provided on the lubricant holding member 3d pushes the second electrode member 242 toward the first electrode member 241, thereby causing the cleaning member 246 to slide and move on the surface of the first electrode member 241 and scrap the lubricant stuck to the first electrode member 241. At the near-end of the solid lubricant 3b, the projection 242a of the second electrode member 242 abuts the area cleaned by the cleaning member 246 on the first electrode member 241. The cleaning member 246 is a readily deformable material such as a sponge and the second electrode member 242 is formed in a plate spring shape as illustrated in FIG. 19(a) by bending a metal plate, thereby enabling the second cleaning member 242 to move smoothly.

In this way, in the fifth modification, the cleaning member 246 cleans the area of the first electrode member 241 where the first electrode member 241 abuts the second electrode member 242, thereby enabling misdetection due to the sticking of lubricant to be prevented.

As described above, the remaining amount detection mechanism including the first electrode member and the second electrode member can achieve the structures described in the embodiment and the first to fifth modifications. Those structures can prevent lubricant from sticking to the area of the first electrode member where the first electrode member abuts the second electrode member and the area of the second electrode member where the second electrode member abuts the first electrode member.

The lubricant supplying devices described above may be applied to a lubricant supplying device that applies lubricant to the intermediate transfer belt 56.

The descriptions above are represented by way of example. The invention has particular effects in the following aspects (1) to (13).

Aspect (1)

In the lubricant supplying device 3 including the solid lubricant 3b, the supplying member such as the applying roller 3a that supplies lubricant of the solid lubricant 3b to the lubricant supply target such as the photosensitive element 1, and the remaining amount detecting unit such as the remaining amount detecting mechanism detecting that a remaining amount of the solid lubricant 3b is equal to or smaller than a certain amount, the remaining amount detecting unit includes the first electrode member 41 and the second electrode member 42 facing the first electrode member 41, detects that the remaining amount of the solid lubricant 3b is equal to or smaller than the certain amount by detecting conduction between the first electrode member 41 and the second electrode member 42. The lubricant supplying device further includes a member that causes at least a part of the second electrode member 42 to move and causes the second electrode member 42 to abut the first electrode member 41, as the solid lubricant 3b is consumed. In the lubricant supplying device 3 thus structured, the structures and arrangement of the electrode members enable the abutting area of the first electrode member 41 and the second electrode member 42 to be disposed at a position separated from an environment in which lubricant readily sticks to the area, as described in the embodiment. As a result, the lubricant supplying device 3 can prevent lubricant from sticking to the area of the first electrode member 41 where the first electrode member 41 abuts the second electrode member 42 and the area of the second electrode member 42 where the second electrode member 42 abuts the first electrode member 41, thereby enabling misdetection due to the sticking of lubricant to be prevented. In addition, when an amount of the solid lubricant 3b is equal to or smaller than the certain amount, conduction is established and power starts to be consumed, thereby enabling power consumption to be further reduced than the device in which an established conduction state is changed to a non-conduction state when the amount of the solid lubricant 3b is equal to or smaller than the certain amount.

Aspect (2)

The lubricant supplying device 3 described in aspect (1) further includes the pushing mechanism 3c that has a pair of swing members 31a supported siwngably in the housing case 3e housing the solid lubricant 3b and the biasing unit such as the spring 31 biasing the swing members 31a, and in which a biasing force of the biasing unit causes the swing members 31a to swing while sliding on the inner surface of the housing case 3e and push the solid lubricant 3b to the supplying member such as the applying roller 3a. The member causing the second electrode member 42 to abut the first electrode member 41 is at least one of the pair of swing members 31a. The swing member 31a pushes the second electrode member 42 when the swing member 31a swings to an extent larger than a certain limit. The lubricant supplying device 3 thus structured enables the second electrode member 42 to abut the first electrode member 41 when the amount of the lubricant is equal to or smaller than the certain amount.

Aspect (3)

In the lubricant supplying device 3 described in aspect (1), the member causing the second electrode member 42 to abut the first electrode member 41 is the lubricant holding member 3d that holds the solid lubricant 3b. The lubricant supplying device 3 thus structured also enables the second electrode member 42 to abut the first electrode member 41 when the amount of the lubricant is equal to or smaller than the certain amount.

Aspect (4)

The lubricant supplying device 3 described in any one of aspects (1) to (3) includes the housing case 3e that houses the solid lubricant 3 so as to allow the solid lubricant 3 to move toward the supplying member such as the applying roller 3a. At least the abutting area of the first electrode member 41 and the second electrode member 42 is provided outside the housing case 3e. The lubricant supplying device 3 thus structured can prevent lubricant from sticking to the area of the second electrode member 241 where the second electrode member 241 abuts the first electrode member 242, thereby enabling misdetection due to the sticking of lubricant to be prevented, as described in the fourth modification.

Aspect (5)

In the lubricant supplying device 3 described in aspect (4), the opening 34a is provided in the housing case 3e and the second electrode member 42 is provided on a member that covers the opening 34a of the housing case 3e or the second electrode member 42 is provided to cover the opening 34a. The lubricant supplying device 3 thus structured can prevent lubricant from sticking to the area of the second electrode member 42 where the second electrode member 42 abuts the first electrode member 41 and the area of the first electrode member 41 where first electrode member 41 abuts the second electrode member 42 because the first electrode member 41 and the second electrode member 42 are abutted outside the housing case 3e, as described in the embodiment. In addition, the first electrode member 41 covering the opening 34a of the housing case 3e enables lubricant to be prevented from scattering from the opening 34a of the housing case 3e, and to be prevented from sticking to the area of the second electrode member 42 where the second electrode member 42 abuts the first electrode member 41 and the area of the first electrode member 41 where the first electrode member 41 abuts the second electrode member 42. As a result, conduction is well established when an amount of the lubricant of the solid lubricant 3b is equal to or smaller than the certain amount, thereby enabling the remaining amount of the lubricant to be well detected.

Aspect (6)

In the lubricant supplying device 3 described in aspect (5), the second electrode member 42 is an elastically deformable member and one end of the second electrode member 42 is fixed to the housing case 3e. In the lubricant supplying device 3 thus structured, the second electrode member 42 is elastically deformed by being pushed by the member and the other end of the second electrode member 42 leaves from the housing case 3e and abuts the first electrode member 41. Accordingly, the lubricant supplying device 3 enables the second electrode member 42 to abut the first electrode member 41 when the amount of the lubricant is equal to or smaller than the certain amount.

Aspect (7)

In the lubricant supplying device 3 described in aspect (5), the second electrode member 42 is an expandable member and seals the opening 34a. In the lubricant supplying device 3 thus structured, when the member pushes the second electrode member 42, the portion of the second electrode member 42 that the member abuts expands and abuts the first electrode member 41. Accordingly, the lubricant supplying device 3 enables the second electrode member 42 to abut the first electrode member 41 when the amount of the lubricant is equal to or smaller than the certain amount. Furthermore, the second electrode member 42 sealing the opening 34a can prevent lubricant from scattering from the opening 34a.

Aspect (8)

In the lubricant supplying device 3 described in any one of aspects (1) to (7), the cleaning member 246 is provided that is attached to one electrode member (in the embodiment, the second electrode member 242) and moved along a surface of the other electrode member by the movement of the second electrode member 42 caused by an increase in consumption of the solid lubricant 3b and cleans the other electrode member (in the embodiment, the first electrode member 241). The lubricant supplying device 3 thus structured can remove lubricant stuck to the area of the other electrode member where the other electrode member abuts the one electrode member by the cleaning member 246, as described in the fifth modification. As a result, misdetection due to the sticking of lubricant can be prevented.

Aspect (9)

In the lubricant supplying device described in any one of aspects (1) to (8), the first electrode member 41 and the second electrode member 42 are abutted near both ends in the longitudinal direction of the solid lubricant 3b. Accordingly, even when consumption of the lubricant differs in the longitudinal direction of the solid lubricant 3b, the second electrode member 42 on a side adjacent to the end on a side in which the lubricant is consumed more than the other side abuts the first electrode member 41, thereby establishing conduction. The lubricant supplying device thus structured can accurately detect the near-end of the lubricant even when the consumption amount of the lubricant differs in the longitudinal direction of the solid lubricant 3b. As a result, occurrence of failures such as scratches on the surface of the photosensitive element occurring when no lubricant protection is provided on the side in which the lubricant is exhausted due to a large amount of consumption.

Aspect (10)

In the lubricant supplying device described in any one of aspects (1) to (9), the solid lubricant 3b contains a fatty acid metal salt. The lubricant supplying device thus structured can form a protective lubricant film layer that is hardly affected by environmental change and has a high ability of protecting the surface of the photosensitive element, thereby enabling the surface of the photosensitive element to be protected well, as described in the embodiment. In addition, the lubricant supplying device can maintain the surface of the photosensitive element in a low frictional state, thereby enabling the occurrences of cleaning failures to be prevented.

Aspect (11)

In the lubricant supplying device described in any one of aspects (1) to (10), the solid lubricant contains inorganic lubricant. The lubricant supplying device thus structured can protect the surface of the photosensitive element well, thereby enabling the occurrences of failures due to the sticking of lubricant to the roller charging device 2a and noises of the cleaning blade 8a due to the vibration thereof to be prevented.

Aspect (12)

Figure 21:
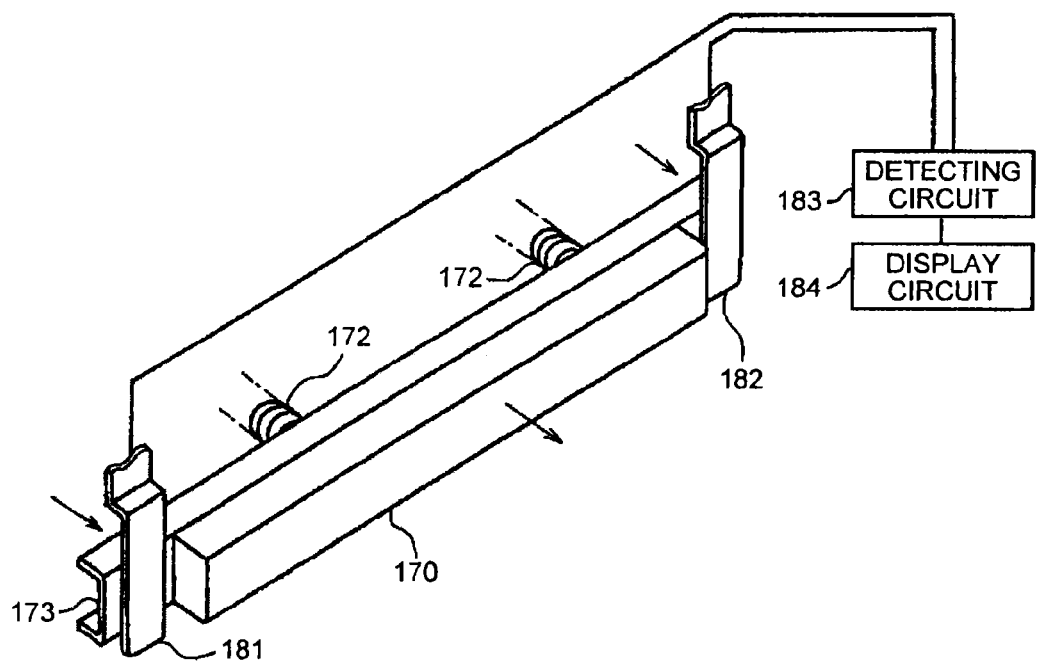
FIG. 21 is a schematic structural view illustrating a conventional lubricant remaining amount detecting mechanism.

In the lubricant supplying device 3 that includes the solid lubricant 3b and applies lubricant of the solid lubricant 3b to the lubricant apply target such as the photosensitive element 1 by the supplying member such as the applying roller 3a, a member is provided that causes at least a part of the second electrode member 42 to abut the first electrode member 41 in the remaining amount detecting unit such as the remaining amount detecting mechanism detecting that the amount of the solid lubricant 3b is equal to or smaller than a certain amount by detecting conduction between the first electrode member 41 and the second electrode member 42 facing the first electrode member 41. The lubricant supplying device 3 thus structured can dispose the abutting area in which conduction is established when the remaining amount of the lubricant is equal to or smaller than a certain amount (in the embodiment, the abutting area of the first electrode member 41 and the second electrode member 42) to a position separated from an environment in which the lubricant readily sticks to the abutting area as described in the embodiment, unlike the conventional technique illustrated in FIG. 21, in which the fact that the remaining amount of the lubricant is equal to or smaller than a certain amount is detected when the lubricant holding member 143 abuts the electrode member 182. As a result, the lubricant supplying device 3 can prevent lubricant from sticking to the area of the first electrode member 41 where the first electrode member 41 abuts the second electrode member 42 abuts and the area of the second electrode member 42 where the second electrode member 42 abuts the first electrode member 41, thereby enabling misdetection due to the sticking of lubricant to be prevented. In addition, when the amount of the solid lubricant 3b is equal to or smaller than the certain amount, conduction is established and power starts to be consumed, thereby enabling power consumption to be further reduced than the device in which an established connection state is changed to a non-conduction state when the amount of the solid lubricant 3b is equal to or smaller than a certain amount.

Aspect (13)

In an image forming apparatus that includes an image carrier such as the photosensitive element 1 and a lubricant supplying unit supplying lubricant to a surface of the image carrier, and forms an image on a recording material by transferring an image on the image carrier to the recording material, the lubricant supplying device described in any one of aspects (1) to (12) is used as the lubricant supplying unit. The image forming apparatus thus structured can detect a near-end of the lubricant, thereby enabling image forming operation to be prevented from being performed without supply of the lubricant. As a result, the temporal deterioration of the photosensitive element can be prevented.

Aspect (14)

In a process cartridge that includes an image carrier such as the photosensitive element 1 and a lubricant supplying unit supplying lubricant to a surface of the image carrier, and is attachable to and detachable from an image forming apparatus, the lubricant supplying device described in any one of aspects (1) to (12) is used as the lubricant supplying unit. The process cartridge thus structured can appropriately detect a near-end of the lubricant, thereby enabling image forming operation to be prevented from being performed without supply of the lubricant. As a result, the process cartridge can be provided that can prevent the temporal deterioration of the photosensitive element.

The embodiment has the structures and arrangement of the first and the second electrode member that enable the abutting area of the first electrode member and the second electrode member to be disposed at a position separated from an environment in which lubricant readily sticks to the abutting area. As a result, the lubricant supplying device can prevent lubricant from sticking to the area of the first electrode member where the first electrode member abuts the second electrode member and the area of the second electrode member where the second electrode member abuts the first electrode members, thereby enabling misdetection due to the sticking of lubricant to be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A lubricant supplying device, comprising:
    lubricant;
    a supplying member that supplies the lubricant to a lubricant supply target;
    a remaining amount detecting unit that includes a first electrode member and a second electrode member and detects that a remaining amount of the lubricant is equal to or smaller than a certain amount;
    a member that causes at least a part of the second electrode member to move and causes the second electrode member to abut the first electrode member with an increase in consumption of the lubricant; and
    a housing case that houses the lubricant so as to allow the lubricant to move toward the supplying member,
    wherein at least an abutting area of the first electrode member and the second electrode member is provided outside the housing case.

2. The lubricant supplying device according to claim 1, further comprising a pushing mechanism that includes a pair of swing members supported swingably in the housing case and a biasing unit biasing the pair of swing members,
    wherein a biasing force of the biasing unit causes the swing members to swing while sliding on an inner surface of the housing case and push the lubricant to the supplying member,
    wherein the member causing the second electrode member to abut the first electrode member is at least one of the swing members, and
    wherein the at least one of the swing members pushes the second electrode member when the at least one of the swing members swings by an amount equal to or larger than a certain limit.

3. The lubricant supplying device according to claim 2, wherein the housing case includes an opening, and
    wherein the at least one of the swing members includes a first end that slides on the inner surface of the housing case and moves into the opening to contact the second electrode and move the second electrode into abutment with the first electrode.

4. The lubricant supplying device according to claim 1, wherein the member causing the second electrode member to abut the first electrode member is a lubricant holding member that holds the lubricant.

5. The lubricant supplying device according to claim 4, wherein the member causing the second electrode member to abut the first electrode member includes a pushing portion projecting in a lateral direction on the lubricant holding member.

6. The lubricant supplying device according to claim 4, wherein an opening is provided in the housing case and a part of the lubricant holding member projects through the opening.

7. The lubricant supplying device according to claim 1, wherein the housing case has an opening, and
    the second electrode member is provided on a member that covers the opening of the housing case or the second electrode member is provided to cover the opening.

8. The lubricant supplying device according to claim 7, wherein
    the second electrode member is elastically deformable, and
    one end of the second electrode member is fixed to the housing case.

9. The lubricant supplying device according to claim 7, wherein
    the second electrode member is expandable, and
    the second electrode member seals the opening.

10. The lubricant supplying device according to claim 7, wherein the consumption of the lubricant member increases and the member moves into contact with the second electrode member, and
    wherein one of the member and the second electrode member moves in the opening to move the second electrode into abutment with the first electrode member.

11. The lubricant supplying device according to claim 1, further comprising a cleaning member that is attached to one electrode member and is moved along a surface of another electrode member by a movement of the second electrode member caused by an increase in consumption of the lubricant and cleans the other electrode member.

12. The lubricant supplying device according to claim 1, wherein the second electrode member and the first electrode member are abutted near both ends in a longitudinal direction of the lubricant.

13. The lubricant supplying device according to claim 1, wherein the lubricant contains a fatty acid metal salt.

14. The lubricant supplying device according to claim 1, wherein the lubricant contains inorganic lubricant.

15. The lubricant supplying device according to claim 1, wherein the lubricant is solid lubricant.

16. The lubricant supplying device according to claim 1, wherein the first electrode member and the second electrode member face each other.

17. An image forming apparatus, comprising:
an image carrier; and
a lubricant supplying unit that supplies lubricant to a surface of the image carrier, wherein
an image is formed on a recording material by transferring an image on the image carrier to the recording material, and
the lubricant supplying device according to claim 1 is used as the lubricant supplying unit.

18. A process cartridge, comprising:
an image carrier; and
a lubricant supplying unit that supplies lubricant to a surface of the image carrier, wherein
the process cartridge is attachable to and detachable from an image forming apparatus body, and
the lubricant supplying device according to claim 1 is used as the lubricant supplying unit.

19. The lubricant supplying device according to claim 1, wherein the member that causes the second electrode member to abut the first electrode member includes at least one of a lubricant holding member and a member moved by an abutment with the lubricant holding member.

20. The lubricant supplying device according to claim 19, wherein an opening is provided in the housing case and a part of the lubricant holding member projects through the opening.

21. The lubricant supplying device according to claim 19, wherein the abutting area of the first electrode member and the second electrode member does not face an opening provided in the housing case.

22. A lubricant supplying device that includes solid lubricant and applies lubricant of the solid lubricant to a lubricant apply target by a supplying member, the lubricant supplying device comprising:
a member that causes at least a part of a second electrode member to abut a first electrode member in a remaining amount detecting unit detecting that the solid lubricant is equal to or smaller than a certain amount by detecting conduction between the first electrode member and the second electrode member facing the first electrode member; and
a housing case that houses the lubricant so as to allow the lubricant to move toward the supplying member,
wherein at least an abutting area of the first electrode member and the second electrode member is provided outside the housing case.

23. An image forming apparatus, comprising:
an image carrier; and
a lubricant supplying unit that supplies lubricant to a surface of the image carrier, wherein
an image is formed on a recording material by transferring an image on the image carrier to the recording material, and
the lubricant supplying device according to claim 22 is used as the lubricant supplying unit.

24. A process cartridge, comprising:
an image carrier; and
a lubricant supplying unit that supplies lubricant to a surface of the image carrier, wherein
the process cartridge is attachable to and detachable from an image forming apparatus body, and
the lubricant supplying device according to claim 22 is used as the lubricant supplying unit.

25. A lubricant supplying device, comprising:
lubricant;
a supplying member that supplies the lubricant to a lubricant supply target;
a remaining amount detecting unit that includes a first electrode member and a second electrode member and detects that a remaining amount of the lubricant is equal to or smaller than a certain amount; and
a member that causes at least a part of the second electrode member to move and causes the second electrode member to abut the first electrode member with an increase in consumption of the lubricant,
wherein the member causing the second electrode member to abut the first electrode member is a lubricant holding member that holds the lubricant.

26. An image forming apparatus, comprising:
an image carrier; and
a lubricant supplying unit that supplies lubricant to a surface of the image carrier, wherein
an image is formed on a recording material by transferring an image on the image carrier to the recording material, and
the lubricant supplying device according to claim 25 is used as the lubricant supplying unit.

27. A process cartridge, comprising:
an image carrier; and
a lubricant supplying unit that supplies lubricant to a surface of the image carrier, wherein
the process cartridge is attachable to and detachable from an image forming apparatus body, and
the lubricant supplying device according to claim 25 is used as the lubricant supplying unit.

28. A lubricant supplying device, comprising:
lubricant;
a supplying member that supplies the lubricant to a lubricant supply target;
a remaining amount detecting unit that includes a first electrode member and a second electrode member and detects that a remaining amount of the lubricant is equal to or smaller than a certain amount;
a lubricant holding member that holds the lubricant; and
a member that causes at least a part of the second electrode member to move and causes the second electrode member to abut the first electrode member with an increase in consumption of the lubricant,
wherein the member causing the second electrode member to abut the first electrode member includes at least one of the lubricant holding member and a member moved by an abutment with the lubricant holding member.

29. The lubricant supplying device according to claim 28, wherein the member causing the second electrode member to abut the first electrode member includes a pushing portion projecting in a lateral direction on the lubricant holding member.

30. The lubricant supplying device according to claim 28, wherein the member causing the second electrode member to abut the first electrode member includes a first surface and a second surface of the member moved by the abutment with the lubricant holding member, and
wherein the first surface abuts a portion of lubricant holding member according to a movement of the lubricant holding member and the second surface moves the second electrode to abut the first electrode.

31. The lubricant supplying device according to claim 28, wherein the second electrode member and the first electrode member are abutted near both ends in a longitudinal direction of the lubricant.

32. The lubricant supplying device according to claim 28, wherein the lubricant is solid lubricant.

33. The lubricant supplying device according to claim 28, wherein the first electrode member and the second electrode member face each other.

34. An image forming apparatus, comprising:
  an image carrier; and
  a lubricant supplying unit that supplies lubricant to a surface of the image carrier, wherein
  an image is formed on a recording material by transferring an image on the image carrier to the recording material, and
  the lubricant supplying device according to claim 28 is used as the lubricant supplying unit.

35. A process cartridge, comprising:
  an image carrier; and
  a lubricant supplying unit that supplies lubricant to a surface of the image carrier, wherein
  the process cartridge is attachable to and detachable from an image forming apparatus body, and
  the lubricant supplying device according to claim 28 is used as the lubricant supplying unit.

* * * * *